Figure 1:
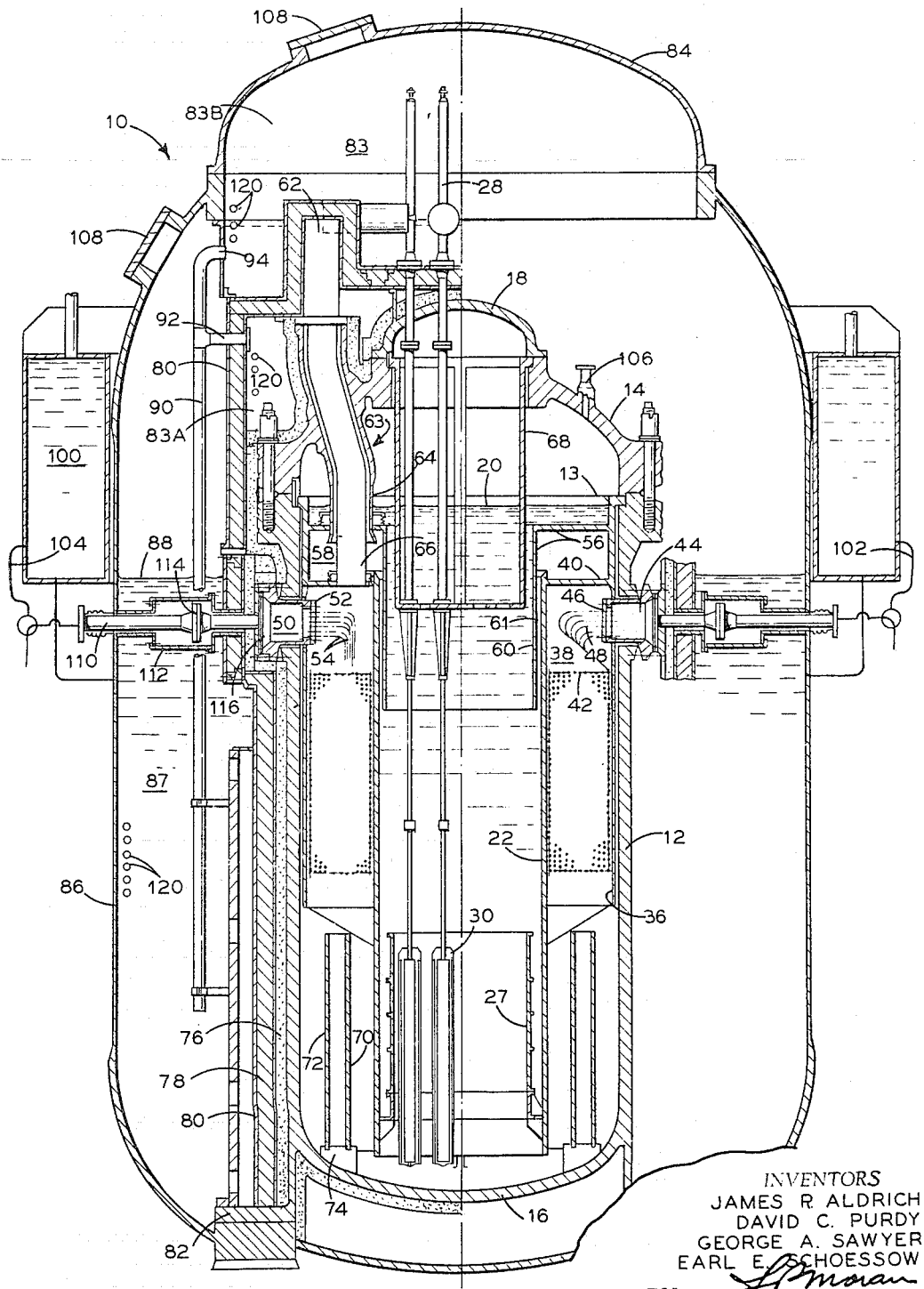
Figure 1:
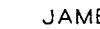

Dec. 6, 1966    E. E. SCHOESSOW ET AL    3,290,222
COMPACT NUCLEAR STEAM GENERATOR

Filed Nov. 15, 1963    2 Sheets-Sheet 1

INVENTORS
JAMES R. ALDRICH
DAVID C. PURDY
GEORGE A. SAWYER
EARL E. SCHOESSOW
BY 
ATTORNEY

United States Patent Office 3,290,222
Patented Dec. 6, 1966

3,290,222
COMPACT NUCLEAR STEAM GENERATOR
Earl E. Schoessow, James R. Aldrich, David C. Purdy, and George A. Sawyer, Lynchburg, Va., assignors to The Babcock & Wilcox Company, New York, N.Y., a corporation of New Jersey
Filed Nov. 15, 1963, Ser. No. 324,087
11 Claims. (Cl. 176—37)

The present invention relates to a compact nuclear reactor plant and more particularly to a reactor plant arrangement combining a pressurized water nuclear reactor, its steam generator and pressurizer all within a single vessel.

With the various advances in nuclear reactor technology and the continuing effort to achieve reactor plants economically comparable with conventional power plants there has been a sustained endeavor to reduce the size and complexity of nuclear power plants. This is true both for reactor plants employed in power generation or in marine propulsion such as the N.S. Savannah. In the area of marine propulsion there has been considerable effort to reduce the overall size of the reactor plant and its containment. An example of such a reactor plant may be found in the Patent No. 3,151,034, issued September 29, 1964, on a Consolidated Nuclear Steam Generator Arrangement, to R. M. Douglass et al. The present application discloses an advancement over that arrangement which affords a further step in the reduction of the overall size and complexity of nuclear reactor plants and their containment, particularly those intended to power marine propulsion systems. While the present application is particularly directed to marine propulsion, the general arrangement is also applicable to conventional electric power generating uses.

It is, therefore, the primary object of this invention to provide a compact, integral, once-through steam generator reactor arrangement which incorporates the reactor core, the steam generator and the primary coolant pressurizer all within one vessel.

Another object of the invention is to furnish a containment arrangement for the reactor incorporating vapor suppression so that any leakage from the reactor vessel will be absorbed within the containment thereby maintaining the integrity of the plant.

Therefore, the present invention provides a compact nuclear reactor plant in which the primary coolant may be pumped in a closed circuit at high loads, while at low loads or during shutdown, where decay heat must be removed, natural circulation may be employed. Primary coolant is contained within a vertically disposed pressure vessel and forms a liquid level in the vessel's upper region.

Below the liquid level and within a vertically disposed cylinder, the core is arranged for the upward flow of primary coolant over the individual fuel elements. Above the core and between the cylinder and the pressure vessel a plurality of helically coiled tubes form the once-through steam generator located in a flow space closed at its top. Headers disposed in the pressure vessel provide the inlet and outlet means for the water flowing through the steam generator. These headers are accessible from the outside of the reactor vessel thereby permitting plugging of individual tubes without entering the reactor. On top of the reactor a number of pumps are mounted for force circulating the primary coolant over the steam generating tubes. A chamber, separated from the space containing the steam generating tubes, provides an intake plenum for the pump. In this arrangement the primary coolant after it has passed through the core is sucked up into the pump and then forced downwardly over the steam generating tubes in counter-flow relationship with the secondary coolant flowing through the tubes.

After its passage over the tubes the primary coolant flows to the bottom of the vessel and then passes inwardly into the cylinder completing its cycle through the reactor plant.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there has been illustrated and described preferred embodiments of the invention.

Figure 2:
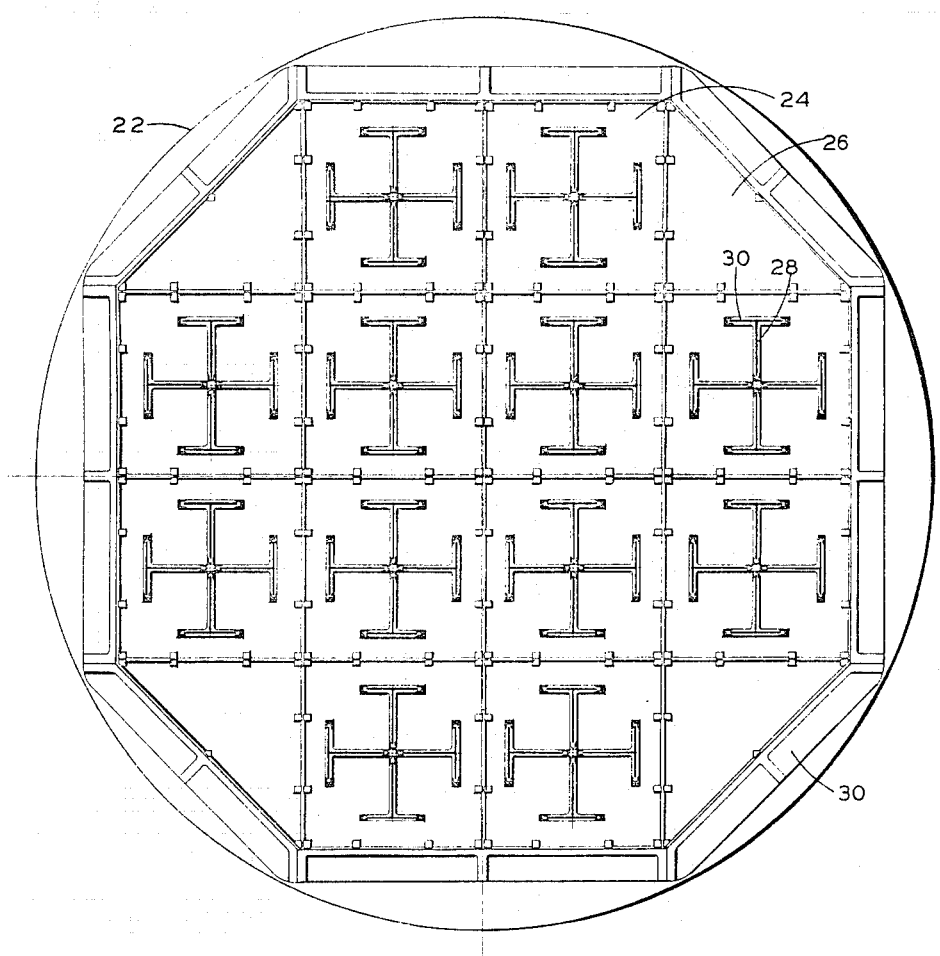

Of the drawings:

FIG. 1 is a vertical section of a compact nuclear reactor plant embodying the present invention, with portions shown schematically, and for sake of simplicity, considerable detail has been eliminated from the right-hand side of the section, however, the left-hand and right-hand sides are substantially identical; and FIG. 2 is a horizontal view of the reactor core showing the general arrangement of fuel elements and control rods.

In FIG. 1 there is illustrated a nuclear reactor plant 10. The main part of the reactor plant 10 is contained within a vertically positioned pressure vessel 12. At its upper end the vessel 12 has a full diameter opening 13 closed by a bolt-connected upper head member 14. At its lower end the vessel has a curved base 16. Centrally located in the head member 14 is a removable refueling port 18 which affords limited access to the interior of the vessel.

Primary coolant fills most of the vessel providing a liquid level 20 in the vicinity of the joint between the pressure vessel and its head member. Within the vessel and below the liquid level 20 there is an open-ended vertically disposed cylinder 22 whose lower end is spaced closely above the vessel base 16. The nuclear reaction is provided by a plurality of square fuel elements 24 and triangular fuel elements 26 shown in FIG. 2 arranged in a regular lattice and located within the lower end of the cylinder 22. Closely disposed about the fuel elements, and extending for the height of the core, is a wall 27 situated inwardly from the cylinder.

Vertically arranged control rod drives 28 are mounted on the head 14, and the control rods 30 are located in the vessel extending downwardly into the core formed by the fuel elements. Each of the square fuel elements 24 contains four T-shaped control rods 30 as illustrated in FIG. 2. The triangular fuel elements 26 located at the four corners of the core do not contain control rods. Filler plates 32 are disposed between wall 27 and the fuel elements to limit the amount of coolant passing upwardly about the core.

Above the core a shroud 36 is concentrically positioned about the cylinder 22 and closely spaced from the wall of the pressure vessel 12. In combination with the cylnider the shroud forms an annular flow space 38. The top of the flow space is closed by an annular-shaped, horizontally disposed wall section 40 which extends between the cylinder and the shroud.

In this flow space 38 a plurality of helically coiled, vertically extending tubes 42 form the reactor plant steam generator through which a secondary coolant passes. Inlet header 44 extends into the pressure vessel and has a tube sheet 46 located within the annular flow space 38. Inlet tubes 48 are connected into the tube sheet 46 and then are bent so that they extend downwardly along the inside wall of the shroud 36. At the lower end of the shroud the inlet tubes are bent inwardly connecting to the steam generating tubes 42.

Outlet header 50, similarly constructed as the inlet header 44, also extends into the pressure vessel with the outlet header tube sheet 52 positioned within the annular flow space 38. While only one inlet and one outlet header are illustrated, a plurality of these headers would be disposed at equally spaced positions about the pressure vessel. Outlet tubes 54 extend from the ends of the helically coiled steam generator tubes upwardly into the tube sheet 52 of the outlet header. With multiple inlet and outlet headers being used, the steam generating tubes are arranged so that individual groups of tubes extend between corresponding inlet and outlet headers. In this manner it is possible to control flow through certain groups as may be required during reactor operation.

Above and in combination with the wall section 40, partitions 56 and the top portion of the shroud 36 form an inlet plenum chamber 58. Extending downwardly from the vertical portion of the partitions 56 is a cylindrically-shaped baffle 60 spaced within and closely from the cylinder 22. The annular space between the cylinder and the baffle forms a riser passageway 61 for primary coolant flowing from within the cylinder to plenum chamber 58.

In FIG. 1 a pump 62 is illustrated positioned atop the head member 14 though actually three pumps would be used. Extending downwardly from the pump into the reactor vessel is a concentrically disposed conduit arrangement 63. The lower end of outer conduit 64 is situated in the plenum chamber 58 while the inner conduit 66 extends through the plenum chamber and opens at its lower end into the flow space 38. Primary coolant flows upwardly through the outer conduit 64 into the pump 62 and is then circulated down through the inner conduit 66 into the flow space 38 for downward passage therethrough over the steam generating tubes 42.

In the upper part of the vessel dependently supported from said head member 14 is a cage 68 which provides support for the control rods 30.

In the lower portion of the vessel below the flow space 38 and concentrically disposed about the core are a pair of thermal sleeves 70, 72 supported about their lower ends by a number of spaced gusset plates 74.

The exterior surface of the pressure vessel is enclosed in insulation 76. About the insulation is a layer of shielding material 78 and on the outside of the shielding material is an inner containment wall 80. This wall 80 extends from reactor support 82 upwardly to a point above the reactor vessel and forms an inner containment chamber 83 about the vessel closed at its top by a containment dome 84. Above the reactor vessel the inner containment chamber is divided into two separate spaces 83A, 83B by the transverse shielding 78 about pump 62. An outer containment wall 86 extends from the support 82 below the reactor to the dome 84 and spaced outwardly from the inner containment wall 80. The inner and outer containment walls combine to form an outer containment chamber 87 extending for the height of the reactor vessel. Water, acting as a biological shield, is contained with the outer chamber 87 to a level 88 located a substantial distance above the top of the core.

Within the outer containment chamber 87 there is a vertically disposed vapor suppression pipe 90 whose lower end is located below the water level 88. At its upper end the pipe 90 is connected by the pipe sections 92, 94 to the containment spaces 83A, 83B located above the pressure vessel head. In the event of a failure in the reactor vessel the water within the containment chamber 87 will condense any vapor which leaks into the spaces 83A, 83B.

Disposed about the outer containment wall 86 is an emergency cooling tank 100 having a vent 101 open to the atmosphere. After reactor shutdown, if it is necessary to dissipate decay heat, by-pass lines 102 and 104 are connected to the secondary coolant inlet and outlet headers, respectively, for circulating secondary coolant through cooling tank 100 and the steam generating tubes 42 in heat transfer relationship with the primary coolant.

Primary relief nozzle 106 is located in the head member opening to the space above the liquid level 20 in the event excessive pressures are developed within the vessel.

In the containment dome 84 and in the outer containment wall 86 manholes 108 are provided for gaining access to the interior of the containment to perform maintenance on the reactor vessel. In the event it is necessary to plug any of the inlet or outlet tubes connected to the steam generating tubes, this operation can be performed from within the outer containment chamber 87 without requiring that the reactor itself be entered. In the left-hand half of FIG. 1 it will be noted that the header piping 110 is positioned within a bolt-connected jacket 112. By removing the bolts and the jacket, access is had to a flange 114 which permits the removal of the outer portion of the outlet pipe 110. The containment wall 80, shielding 78 and insulation 76 exteriorly of the outlet header is bolt-connected so that it may be removed to gain access to cover plate 116 of the outlet header. The cover plate 116 is also bolted in place, and once it is removed, it is then possible to plug the tubes in the tube sheet 52. On the right-hand side there is shown an inlet header to which admittance may be gained in a similar manner. As mentioned earlier, the steam generating tubes are connected between corresponding inlet and outlet headers so that, depending on the number of inlet and outlet headers employed, some portion of the tubes may be removed from service if such a step is useful in reactor operation.

In normal reactor operation the primary coolant is pumped through the reactor, while at low loads, pumping may be discontinued and the primary coolant will flow through the reactor by natural circulation taking the same path as in forced circulation. When the primary coolant is being pumped, it passes upwardly, as indicated by the arrows in FIG. 1, through the core passing through the cylinder 22 into the passageway 61 and then into the plenum chamber 58. The pump sucks the primary coolant up through the outer conduit 65 into the pump and then forces it downwardly through the inner conduit 66 into the flow space 38 where it flows over the steam generating tubes 42 in counter-flow relationship with the secondary coolant passing through the tubes. After its passage over the steam generating tubes the primary coolant flows over the thermal shields and inner wall of the pressure vessel and then passes radially inward under the lower end of the cylinder 32 into the core to complete its cycle.

The secondary coolant enters the vessel through the inlet headers 44, flows downwardly along the inner wall of the shroud to the bottom of the flow space 38 and then into the helically coiled steam generator tubes 42. As it passes upwardly through the tubes 42, the secondary coolant is vaporized and superheated, then flows through the outlet tubes 54 into the outlet header 50. From the outlet header the superheated secondary coolant vapor is directed to a point of use not shown in the drawings. Generally, water would be employed as the primary and secondary coolants, however, persons skilled in the art will appreciate that other coolants might be used, and it is not intended that this application be restricted to the use of water as either or both the primary or secondary coolant.

In order to pressurize the primary coolant a gas overpressure is introduced into the space above the liquid level in the pressure vessel 12. The gas required to provide the overpressure may be placed in the vessel either through a separate inlet connection or through a primary coolant make-up nozzle not shown in the drawings.

By utilizing vapor suppression and properly proportioning the volume of water in the outer containment chamber 87, it is possible to condense all the steam released from a maximum credible accident in the reactor vessel without raising the pressure above the design pressure of the containment. Further, in the reactor vessel the space above the liquid level 20 acts as a surge volume when changes in water volume occur during operation.

By employing once-through type of operation the need for large bulky steam separation equipment is avoided and the overall size of the reactor plant correspondingly reduced. Further, the position of the steam generating tubes relative to the core has been selected to afford a larger head for natural circulation in the primary system.

In order to remove heat from the containment chambers heat exchangers 120 are located below the liquid level 88 and in the containment spaces 83A, 83B.

By combining the refueling port in the full opening head member, access may be gained to the fuel elements and control rods without removing the head itself. However, if it becomes necessary to do so, the entire head can be removed and the steam generating tubes taken out of the vessel once the tube sheets have been disconnected from the remainder of the inlet and outlet headers.

A plant, such as is shown in FIG. 1, could be contained within an overall space having a height of 36 feet and a diameter including the emergency cooling tank 100 of 25 feet. The ability to provide a complete plant with its containment within such a relatively small volume is a very substantial improvement, particularly in the field of marine propulsion.

While in accordance with the provisions of the statutes there is illustrated and described herein the best forms and modes of operation of the invention now known, those skilled in the art will understand that changes may be made in the form of the apparatus disclosed without departing from the spirit of the invention covered by the claims, and that certain features of the invention may sometimes be used to advantage without a corresponding use of other features.

What is claimed is:

1. A compact nuclear reactor plant comprising:
(A) a vertically elongated pressure vessel,
(B) a body of primary coolant contained within said pressure vessel and forming a liquid level therein,
(C) an open-ended vertically disposed cylinder spaced inwardly from said vessel and having its upper end located below said liquid level,
(D) a plurality of fuel elements arranged in a regular lattice and positioned within the lower end of said cylinder,
(E) a vertically disposed shroud positioned within said vessel and spaced from and encircling said cylinder, said shroud situated below said liquid level and combining with said cylinder to form an annular flow space,
(F) a wall section extending between and attached to upper ends of said cylinder and shroud and forming a closure for the upper end of said flow space sealing it against the admission of primary coolant from within said cylinder,
(G) a bank of vertically extending vapor generating tubes disposed in said flow space and located above said core,
(H) means located below said liquid level for supplying feed fluid to and for removing vaporized fluid from said bank of tubes,
(I) partitions in combination with said wall forming a chamber located above said flow space in communication with the body of primary coolant within said cylinder,
(J) baffle means connected to said partitions and combining with the upper end of said cylinder to form a passageway for flowing primary coolant into said chamber from the upper end of said cylinder,
(K) a primary coolant pump located exteriorly of and mounted on the upper end of said pressure vessel,
(L) a vertically extending first conduit means communicating between said chamber and the inlet to said pump for flowing primary coolant to said pumps, and
(M) vertically extending second conduit means communicating between the outlet from said pumps and the upper end of said flow space for delivering primary coolant into said flow space.

2. A compact nuclear reactor plant as set forth in claim 1 wherein said first conduit means is concentrically arranged around and spaced from said second conduit means.

3. A compact nuclear reactor plant as set forth in claim 2 wherein said means for supplying and removing fluid from said bank of tubes comprises at least one inlet header and at least one outlet header extending through the said pressure vessel into the upper end of said flow space wherein inlet tubes extend downwardly from said inlet header along the inner face of said shroud and are connected to the lower end of tubes in said bank and outlet tubes extend from the upper ends of the tubes in said bank to said outlet header.

4. A compact nuclear reactor plant as set forth in claim 3 wherein the steam generator tubes are helically coiled about said cylinder for the full extent of their length between said inlet and outlet tubes.

5. A compact nuclear reactor plant as set forth in claim 4 wherein a plurality of inlet and outlet headers are employed with the tubes from one inlet header extending to a corresponding outlet header whereby a portion of the steam generating tubes may be removed from service during operation of the reactor.

6. A compact nuclear reactor plant as set forth in claim 1 wherein a vertically extending inner containment wall and a transversely arranged containment dome member combine to form an inner containment chamber enclosing said vessel, an outer vertically extending containment wall spaced outwardly for a portion of its height from said inner containment wall and connected to it at its lower end and to the containment dome member at its upper end forms in combination therewith an annular-shaped laterally disposed outer containment space extending for at least the height of said pressure vessel.

7. A compact nuclear reactor plant as set forth in claim 6 wherein transversely arranged containment walls spaced within said inner containment wall and below said containment dome member enclose said pump mounted on said pressure vessel and divide the said inner containment chamber and above said pressure vessel into two separate spaces.

8. A compact nuclear reactor plant as set forth in claim 7 wherein a body of water is located in the outer containment space to a level above the core within the vessel for providing biological shielding means.

9. A compact nuclear reactor plant as set forth in claim 8 wherein a vapor suppression pipe extends vertically upward from below the water level in said outer containment space to the upper end thereof, and connections are provided from said vapor suppression pipe to the chambers formed within said inner containment wall.

10. A compact nuclear reactor plant as set forth in claim 9 wherein heat exchangers are disposed in said containment space below said water level and in said chambers within said inner containment wall for removing heat from these locations.

11. A compact nuclear reactor plant as set forth in claim 10 wherein an emergency cooling tank is mounted on the exterior of said second containment wall above the outlets from the steam generator tubes, and by-pass pipe means interconnect said inlet and outlet headers and emergency cooling tank for cooling the primary coolant to effect decay heat removal from the reactor during shutdown.

(References on following page)

References Cited by the Examiner

UNITED STATES PATENTS

| | | |
|---|---|---|
| 3,012,547 | 12/1961 | Ostergaard et al. |
| 3,115,450 | 12/1963 | Schanz. |
| 3,127,322 | 3/1964 | Dodd _____ 176—38 |
| 3,151,034 | 9/1964 | Douglass et al. _____ 176—65 |

FOREIGN PATENTS

| | | |
|---|---|---|
| 1,297,494 | 5/1962 | France. |
| 800,385 | 8/1958 | Great Britain. |
| 887,252 | 1/1962 | Great Britain. |
| 911,135 | 11/1962 | Great Britain. |

OTHER REFERENCES

Chemical & Eng. News, vol. 39, No. 28, July 10, 1961, pp. 21 and 22.

L. DEWAYNE RUTLEDGE, *Primary Examiner.*

CARL D. QUARFORTH, *Assistant Examiner.*